United States Patent
Okazaki et al.

(10) Patent No.: US 11,965,673 B2
(45) Date of Patent: Apr. 23, 2024

(54) AIR PURIFIER AND CONTROL METHOD FOR AIR PURIFIER UTILIZING A CONTROL UNIT TO SWITCH A MODE FROM A LEARNING MODE TO AN IMPLEMENTATION MODE

(71) Applicant: SHARP KABUSHIKI KAISHA, Osaka (JP)

(72) Inventors: Akihiro Okazaki, Sakai (JP); Daisuke Moriuchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 698 days.

(21) Appl. No.: 17/273,285

(22) PCT Filed: Sep. 3, 2019

(86) PCT No.: PCT/JP2019/034589
§ 371 (c)(1),
(2) Date: Mar. 3, 2021

(87) PCT Pub. No.: WO2020/066494
PCT Pub. Date: Apr. 2, 2020

(65) Prior Publication Data
US 2021/0325062 A1    Oct. 21, 2021

(30) Foreign Application Priority Data
Sep. 25, 2018 (JP) ................... 2018-178997

(51) Int. Cl.
*F24F 11/65*    (2018.01)
*F24F 8/00*    (2021.01)
(Continued)

(52) U.S. Cl.
CPC ............... *F24F 8/00* (2021.01); *F24F 11/65* (2018.01); *G05B 19/042* (2013.01); *G06N 20/00* (2019.01);
(Continued)

(58) Field of Classification Search
CPC ..................................................... F24F 11/65
See application file for complete search history.

(56) References Cited

U.S. PATENT DOCUMENTS 9,807,983 B2    11/2017   Yuki et al.
2016/0057395 A1    2/2016   Yuki et al.
(Continued)

FOREIGN PATENT DOCUMENTS

CN    104949256 A    9/2015
CN    105242775 A  *  1/2016
(Continued)

*Primary Examiner* — Suresh Suryawanshi
(74) *Attorney, Agent, or Firm* — ScienBiziP, P.C.

(57) ABSTRACT

An air purifier (100) includes a detection unit (130) and a control unit (110). The detection unit (130) periodically detects environment information. The environment information indicates information relating to an environment around the air purifier (100). The control unit (110) determines whether or not the environment information satisfies a specific condition a plurality of times during the specific time period (Ts) corresponding to an event within a prescribed period (Ta). In a case where the control unit (110) determines that the environment information satisfies the specific condition a plurality of times, the control unit switches a mode from a learning mode to an implementation mode. In the implementation mode, in a case where the environment information meets a trigger during the specific time period, the control unit (110) performs event operational control.

14 Claims, 9 Drawing Sheets

(51) Int. Cl.
*G05B 19/042* (2006.01)
*G06N 20/00* (2019.01)
*F24F 110/50* (2018.01)

(52) U.S. Cl.
CPC ... *F24F 2110/50* (2018.01); *G05B 2219/2614* (2013.01)

(56) References Cited

U.S. PATENT DOCUMENTS

2016/0175755 A1* 6/2016 Nakamura ............... F24F 6/06
  55/385.6
2018/0363937 A1* 12/2018 Nagasaka ............... H04Q 9/00

FOREIGN PATENT DOCUMENTS

| | | | |
|---|---|---|---|
| CN | 110531813 A | * | 12/2019 |
| JP | H087188 A | | 1/1996 |
| JP | 2009274050 A | | 11/2009 |
| JP | 2012042074 A | | 3/2012 |
| JP | 2012154526 A | | 8/2012 |
| JP | 2016042870 A | | 4/2016 |
| JP | 2016223694 A | | 12/2016 |
| JP | 2017124363 A | | 7/2017 |
| JP | WO2018190003 A1 | * | 2/2018 |
| WO | WO-2019066301 A1 | * | 4/2019 ............... F24F 11/30 |

\* cited by examiner

| EVENT | SPECIFIC TIME PERIOD | SPECIFIC CONDITION ||||| TRIGGER | EVENT OPERATIONAL CONTROL |
|---|---|---|---|---|---|---|---|---|
| | | ILLUMINANCE | ODOR | DUST | MOTION | OUTING | | |
| WAKE-UP | 5:00 TO 10:00 | DARK → LIGHT | ○ | ○ | — | — | ILLUMINANCE FROM DARK TO LIGHT | FIRST CONTROL |
| COOKING | 17:00 TO 21:00 | LIGHT | ○ | ○ | — | — | DETECT ODOR | SECOND CONTROL |
| YAKINIKU (MEAT GRILLING) | 11:00 TO 21:00 | LIGHT | — | PM2.5 | ○ | — | PM2.5 OF PRSCRIBED AMOUNT OR MORE | THIRD CONTROL |
| BEDTIME | 21:00 TO 8:00 | LIGHT → DARK | ○ | ○ | ○ | — | ILLUMINANCE FROM LIGHT TO DARK | FOURTH CONTROL |
| OUTING | 6:00 TO 21:00 | - | ○ | ○ | — | — | GPS: OUT | FIFTH CONTROL |
| GOING HOME | 6:00 TO 21:00 | - | — | — | — | ○ | GPS: IN | SIXTH CONTROL |

| DETECTION DAY | DAY 1 | DAY 2 | DAY 3 | DAY 4 | DAY 5 | DAY 6 | DAY 7 |
|---|---|---|---|---|---|---|---|
| SPECIFIC CONDITION | ○ | ○ | ○ | ○ | ○ | ○ | X |
| MODE | LEARNING MODE | | | IMPLEMENTATION MODE | | | |

(b)

| DETECTION DAY | DAY 1 | DAY 2 | DAY 3 | DAY 4 | DAY 5 | DAY 6 | DAY 7 |
|---|---|---|---|---|---|---|---|
| SPECIFIC CONDITION | ○ | ○ | ○ | ○ | ○ | X | X |
| MODE | LEARNING MODE | | | IMPLEMENTATION MODE | | LEARNING MODE | |

| DETECTION DAY | DAY 1 | DAY 2 | DAY 3 | DAY 4 | DAY 5 | DAY 6 | DAY 7 |
|---|---|---|---|---|---|---|---|
| SPECIFIC CONDITION | ○ | ○ | X | ○ | ○ | ○ | ○ |
| MODE | LEARNING MODE | | | IMPLEMENTATION MODE | | | |

(b)

| DETECTION DAY | DAY 1 | DAY 2 | DAY 3 | DAY 4 | DAY 5 | DAY 6 | DAY 7 |
|---|---|---|---|---|---|---|---|
| SPECIFIC CONDITION | ○ | ○ | X | ○ | ○ | X | ○ |
| MODE | LEARNING MODE | | | | IMPLEMENTATION MODE | LEARNING MODE | |

FIG. 8

| DETECTION TIME | 19:00 | 19:15 | 19:30 | 19:45 | 20:00 |
|---|---|---|---|---|---|
| SPECIFIC CONDITION | ○ | ○ | ○ | ○ | ○ |
| MODE | LEARNING MODE | | | IMPLEMENTATION MODE | |

FIG. 9

AIR PURIFIER AND CONTROL METHOD FOR AIR PURIFIER UTILIZING A CONTROL UNIT TO SWITCH A MODE FROM A LEARNING MODE TO AN IMPLEMENTATION MODE

TECHNICAL FIELD

The present invention relates to an air purifier and a control method for an air purifier.

BACKGROUND ART

Air purifiers provided with dust sensors are known (e.g., PTL 1). The dust sensor detects an amount of dust in the air. The air purifier described in PTL 1 changes an air flow rate of a blower in accordance with the amount of dust detected by the dust sensor.

CITATION LIST

Patent Literature

PTL 1: JP 2017-124363 A

SUMMARY OF INVENTION

Technical Problem

However, in the air purifier described in PTL 1, the air flow rate of the blower is only changed in accordance with the amount of dust, and operational control corresponding to an event (for example, a lifestyle pattern such as wake-up) cannot be performed.

The present invention has been made in light of the above-described problem, and has an object to provide an air purifier and a control method for an air purifier capable of performing operational control corresponding to an event.

Solution to Problem

An air purifier according to the present invention includes a detection unit and a control unit. The detection unit periodically detects environment information. The environment information indicates information on an environment around the air purifier. The control unit determines whether or not the environment information satisfies a specific condition a plurality of times during a specific time period corresponding to an event within a prescribed period. The control unit switches a mode from a learning mode to an implementation mode in a case of determining that the environment information satisfies the specific condition a plurality of times. The control unit performs, in the implementation mode, event operational control in a case where the environment information meets a trigger during the specific time period.

A control method for an air purifier according to the present invention includes periodically detecting environment information indicating information relating to an environment around the air purifier, determining whether or not the environment information satisfies a specific condition a plurality of times during a specific time period corresponding to an event within a prescribed period, and, in a case of determining that the environment information satisfies the specific condition a plurality of times, switching a mode from a learning mode to an implementation mode, in which the control unit performs, in the implementation mode, event operational control in a case where the environment information meets a trigger during the specific time period.

Advantage Effects of Invention

According to an air purifier and a control method for an air purifier according to the present invention, it is possible to perform operational control corresponding to an event.

BRIEF DESCRIPTION OF DRAWINGS

FIG. 3 is a diagram illustrating a correspondence between events, specific time periods, specific conditions, triggers, and event operational controls.

FIGS. 7(a) and 7(b) are diagrams illustrating examples of switching between the implementation mode and the learning mode of the air purifier.

FIGS. 8(a) and 8(b) are diagrams illustrating examples of switching between the implementation mode and the learning mode of the air purifier.

FIG. 9 is a diagram illustrating an example of switching between the implementation mode and the learning mode of the air purifier.

DESCRIPTION OF EMBODIMENTS

Figure 1:
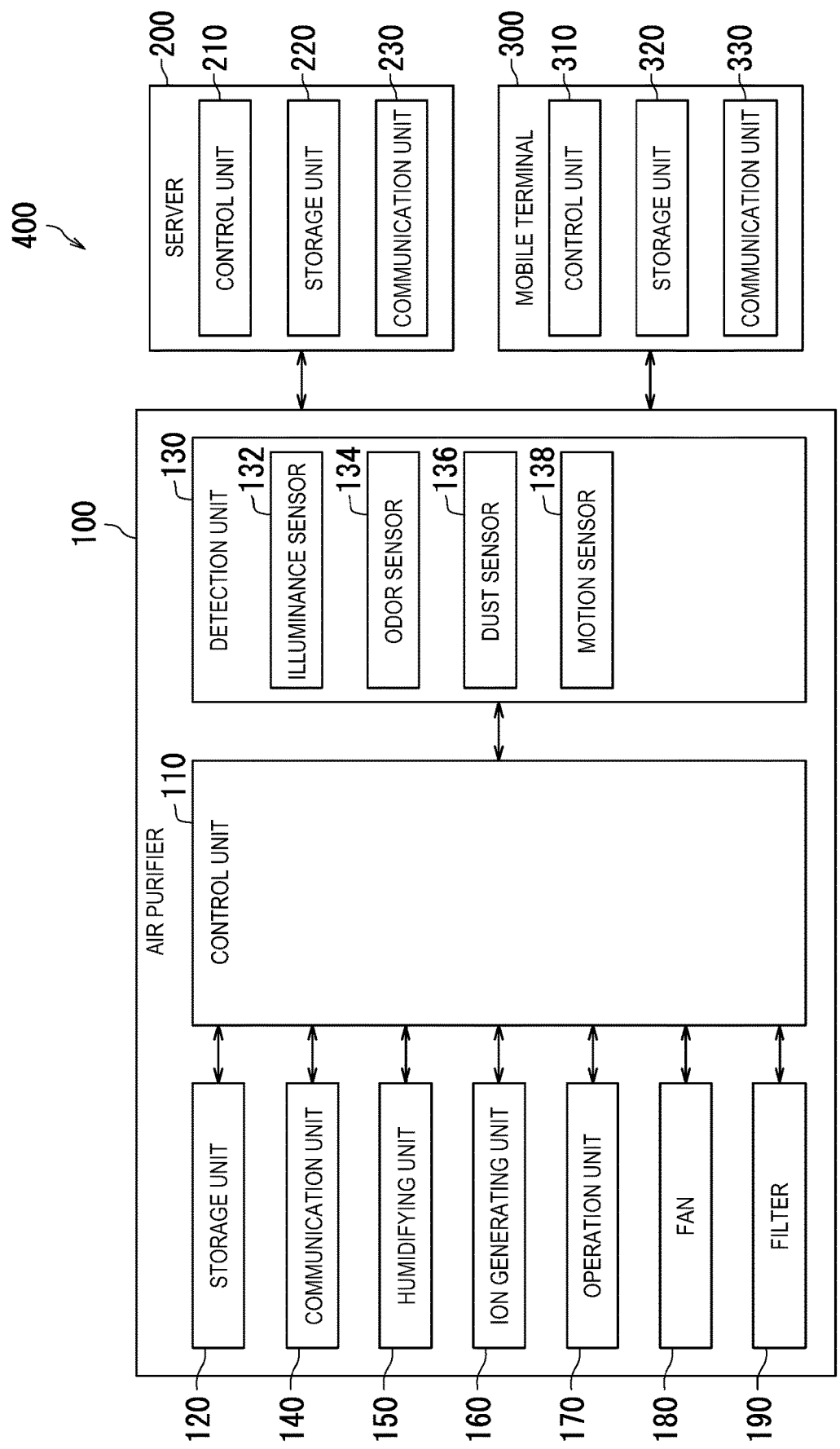
FIG. 1 is a block diagram of an air purifying system including an air purifier according to a first embodiment of the present invention.

Embodiments of the present invention will be described hereinafter with reference to the drawings. Note that, in the drawings, the same or equivalent components are denoted by the same reference signs and description thereof will not be repeated.

First Embodiment

An air purifier 100 according to a first embodiment of the present invention will be described with reference to FIG. 1. FIG. 1 is a block diagram of an air purifying system 400 including the air purifier 100 according to the first embodiment of the present invention.

As illustrated in FIG. 1, the air purifying system 400 includes the air purifier 100, a server 200, and a mobile terminal 300.

The air purifier 100 includes a control unit 110, a storage unit 120, a detection unit 130, a communication unit 140, a humidifying unit 150, an ion generating unit 160, an operation unit 170, a fan 180, and a filter 190.

The control unit 110 is a hardware circuit including a processor such as a Central Processing Unit (CPU), an Application Specific Integrated Circuit (ASIC), and the like. The control unit 110 controls an operation of each unit of the air purifier 100 by the processor reading and executing a control program stored in the storage unit 120.

The storage unit 120 includes a Random Access Memory (RAM) and a Read Only Memory (ROM). The storage unit 120 stores various pieces of data and the control program used for controlling the operations of the respective units of the air purifier 100. The control program is executed by the control unit 110.

The detection unit 130 periodically detects environment information. For example, the detection unit 130 detects the environment information every 15 minutes. The environment information indicates information relating to an environment around the air purifier 100. The detection unit 130 detects a plurality of pieces of the environment information. The environment information includes, for example, illuminance information, odor information, dust information, and user location information. The environment information detected by the detection unit 130 is transmitted to the server 200 via the communication unit 140. The server 200 stores the environment information in the storage unit 220. In other words, the storage unit 220 in the server 200 stores a history of the environment information.

The detection unit 130 includes an illuminance sensor 132, an odor sensor 134, a dust sensor 136, and a motion sensor 138. Sensitivity of the detection unit 130 is controlled by the control unit 110. The sensitivity of the detection unit 130 can be controlled in three stages of "high", "standard" and "low" in descending order of sensitivity, for example.

The illuminance sensor 132 detects an illuminance in a room in which the air purifier 100 is installed.

The odor sensor 134 detects an odor level in the room in which the air purifier 100 is installed. The odor sensor 134 is, for example, a quartz crystal resonance type sensor or a semiconductor type sensor.

The dust sensor 136 detects an amount of dust in the room in which the air purifier 100 is installed. The dust sensor 136 can detect the dust distinguishing between a fine dust of less than 2.5 µm and larger dust of 2.5 µm or more (PM2.5).

The motion sensor 138 detects whether a human is present in the room in which the air purifier 100 is installed. In other words, the motion sensor 138 detects presence-in-room information.

The communication unit 140 can communicate with an electronic device equipped with a communication instrument that utilizes the same communication method (protocol). In the present embodiment, the communication unit 140 communicates with the server 200 and the mobile terminal 300 via a network such as a Local Area Network (LAN). The communication unit 140 is a communication module (communication device) such as a LAN board. The communication unit 140 transmits the environment information detected by the detection unit 130 to the server 200, for example.

The humidifying unit 150 humidifies the room in which the air purifier 100 is installed. The humidifying unit 150 has a water tank (not illustrated). The humidifying unit 150 humidifies the room by vaporizing the water stored in the water tank and causing moisture to be contained in the air.

The ion generating unit 160 generates ions and discharges the ions into the air in the room. The ion generating unit 160 is removable from the body of the air purifier 100.

The operation unit 170 is, for example, a touch panel. The operation unit 170 displays various pieces of information such as an operating state of the air purifier 100. The operation unit 170 receives an operation from a user. The operation unit 170 can switch between on and off.

The fan 180 takes the air in the room in which the air purifier 100 is installed into the air purifier 100 and passes the air through the filter 190. As a result, the filter 190 collects dust in the air. The filter 190 is, for example, a High Efficiency Particulate Air (HEPA) filter. An air flow rate of the fan 180 is controlled by the control unit 110. The air flow rate of the fan 180 can be controlled in four stages of "turbo", "strong", "medium", and "quiet" in descending order of the air flow rate, for example.

The server 200 includes a control unit 210, a storage unit 220, and a communication unit 230.

The control unit 210 is a hardware circuit including a processor such as a CPU, an ASIC, and the like. The control unit 210 controls the operation of each unit of the server 200 by the processor reading and executing a control program stored in the storage unit 220.

The storage unit 220 includes a RAM and a ROM. The storage unit 220 stores various pieces of data and the control program for controlling operations of the respective units of the server 200. The control program is executed by the control unit 210.

The communication unit 230 can communicate with an electronic device equipped with a communication instrument that utilizes the same communication method (protocol). In the present embodiment, the communication unit 230 communicates with the air purifier 100 via a network such as a LAN. The communication unit 230 is a communication module (communication device) such as a LAN board.

The mobile terminal 300 includes a control unit 310, a storage unit 320, and a communication unit 330. The mobile terminal 300 is, for example, a smartphone. The mobile terminal 300 has a GPS function.

The control unit 310 is a hardware circuit including a processor such as a CPU, an ASIC, and the like. The control unit 310 controls the operation of each unit of the mobile terminal 300 by the processor reading and executing a control program stored in the storage unit 320.

The storage unit 320 includes a RAM and a ROM. The storage unit 320 stores various pieces of data and the control program used for controlling operations of the respective units of the mobile terminal 300. The control program is executed by the control unit 310.

The communication unit 330 can communicate with an electronic device equipped with a communication instrument that utilizes the same communication method (protocol). In the present embodiment, the communication unit 330 communicates with the air purifier 100 via a network such as a LAN.

The control unit 110 in the air purifier 100 performs operational control depending on an event. Hereinafter, operational control depending on an event may be described as "event operational control". Examples of the event include "wake-up", "cooking", "yakiniku (meat grilling)", "bedtime", "outing", and "going home". For example, in a case where the event "wake-up" occurs, the control unit 110 performs operational control corresponding to "wake-up". The event operational control includes, for example, changing the sensitivity of the detection unit 130, changing the air flow rate of the fan 180, changing an air flow direction of the fan 180, and switching operation of the humidifying unit 150.

The air purifier 100 has modes including a learning mode and an implementation mode. The learning mode is a mode for learning whether or not an event tends to occur during a specific time period Ts corresponding to the event. The implementation mode is a mode for performing the event operational control.

The operational control of the air purifier 100 will be described with reference to FIG. 1, FIGS. 2(a) and 2(b). FIGS. 2(a) and 2(b) are diagrams illustrating the operational control of the air purifier 100. FIG. 2(a) is a diagram illustrating the operational control of the air purifier 100 across four days. FIG. 2(b) is a diagram illustrating the operational control during the specific time period Ts on the fourth day in FIG. 2(a).

The operational control of the air purifier 100 will be described by way of an example in a case where the event is "wake-up".

As illustrated in FIG. 2(a), the specific time period Ts is configured for one day concerning an event. Here, the specific time period Ts is from 5:00 to 10:00 corresponding to the event "wake-up".

The control unit 110 reads the environment information from the server 200 and determines whether or not the environment information satisfies a specific condition during the specific time period Ts. In other words, in a case where the control unit 110 determines that the environment information satisfies the specific condition during the specific time period Ts, the control unit 110 determines that an event has occurred. In the "determination result for specific condition" illustrated in FIG. 2(a), the mark "○" indicates that the specific condition is satisfied during the specific time period Ts. In other words, the mark "○" indicates that the event "wake-up" has occurred. The control unit 110 determines that the environment information satisfies the specific condition based on whether all pieces of specific environment information among the plurality of pieces of the environment information satisfy the specific condition. The specific condition is configured in association with the event. Here, the specific condition includes, for example, "illuminance from dark to light", "detect odor", and "detect dust" corresponding to the event "wake-up".

The control unit 110 determines whether or not the environment information satisfies the specific condition a plurality of times during the specific time period Ts within a prescribed period Ta. In other words, in a case where the control unit 110 determines that the environment information satisfies the specific condition during the specific time period Ts within the prescribed period Ta, the control unit 110 determines that an event tends to occur during the specific time period Ts. The prescribed period Ta is a period including a plurality of days. For example, the prescribed period Ta is three days. In a case where the control unit 110 determines that the environment information (detection value detected by the detection unit 130) satisfies the specific condition a plurality of times from 5:00 to 10:00 (specific time period Ts) within three days (prescribed period Ta), the control unit 110 determines that an event tends to occur during the specific time period Ts. Here, in a case where the control unit 110 determines that the environment information satisfies the specific condition during the specific time period Ts for a continuous prescribed number of days or more, the control unit 110 determines that an event tends to occur during the specific time period Ts. The prescribed number of days is three days, for example.

In a case where the control unit 110 determines that the environment information satisfies the specific condition for the continuous prescribed number of days or more, the control unit 110 switches the mode from the learning mode to the implementation mode. Here, in a case where the control unit 110 determines that the environment information satisfies the specific condition continuously for three days or more, the control unit 110 switches the mode from the learning mode to the implementation mode. Note that the switching from the learning mode to the implementation mode may be performed previously by the control unit 210 in the server 200. Thereafter, based on the determination result, the control unit 110 may switch the mode from the learning mode to the implementation mode.

As illustrated in FIG. 2(b), the control unit 110 performs, in the implementation mode, the event operational control in a case where the environment information meets a trigger during the specific time period Ts. Specifically, in the implementation mode, the control unit 110 changes the control from a normal operational control to the event operational control in a case where the trigger is met. A time t1 is a time at which the environment information meets the trigger. The control unit 110 determines that the trigger is met based on whether at least one piece of environment information among the specific piece(s) of environment information satisfies the prescribed condition. The trigger is configured in association with the event. For example, here, the trigger is "illuminance from dark to light" corresponding to the event "wake-up", for example. Here, the event operational control is, for example, operational control corresponding to the event "wake-up". Specifically, the event operational control corresponds to "odor sensor sensitivity "High"", "dust sensor sensitivity "High"", and "air flow rate of one stage up".

The control unit 110, in the implementation mode, changes the control from the event operational control to the normal operational control in a case where an end condition is satisfied. A time t2 is a time at which the end condition is satisfied. The end condition indicates that, for example, an end time period Te elapses from a time at which a trigger is met. Here, the end time period Te is two hours. Specifically, at the time t2 (9:00) at which the end time period Te elapses from the time t1 (7:00) at which the trigger is met, the control unit 110 changes the control from the event operational control to the normal operational control. Note that the change from the event operational control to the normal operational control may be previously performed by the control unit 210 in the server 200. Thereafter, based on the determination result, the control unit 110 may switch the control from the event operational control to the normal operational control.

Figure 2:
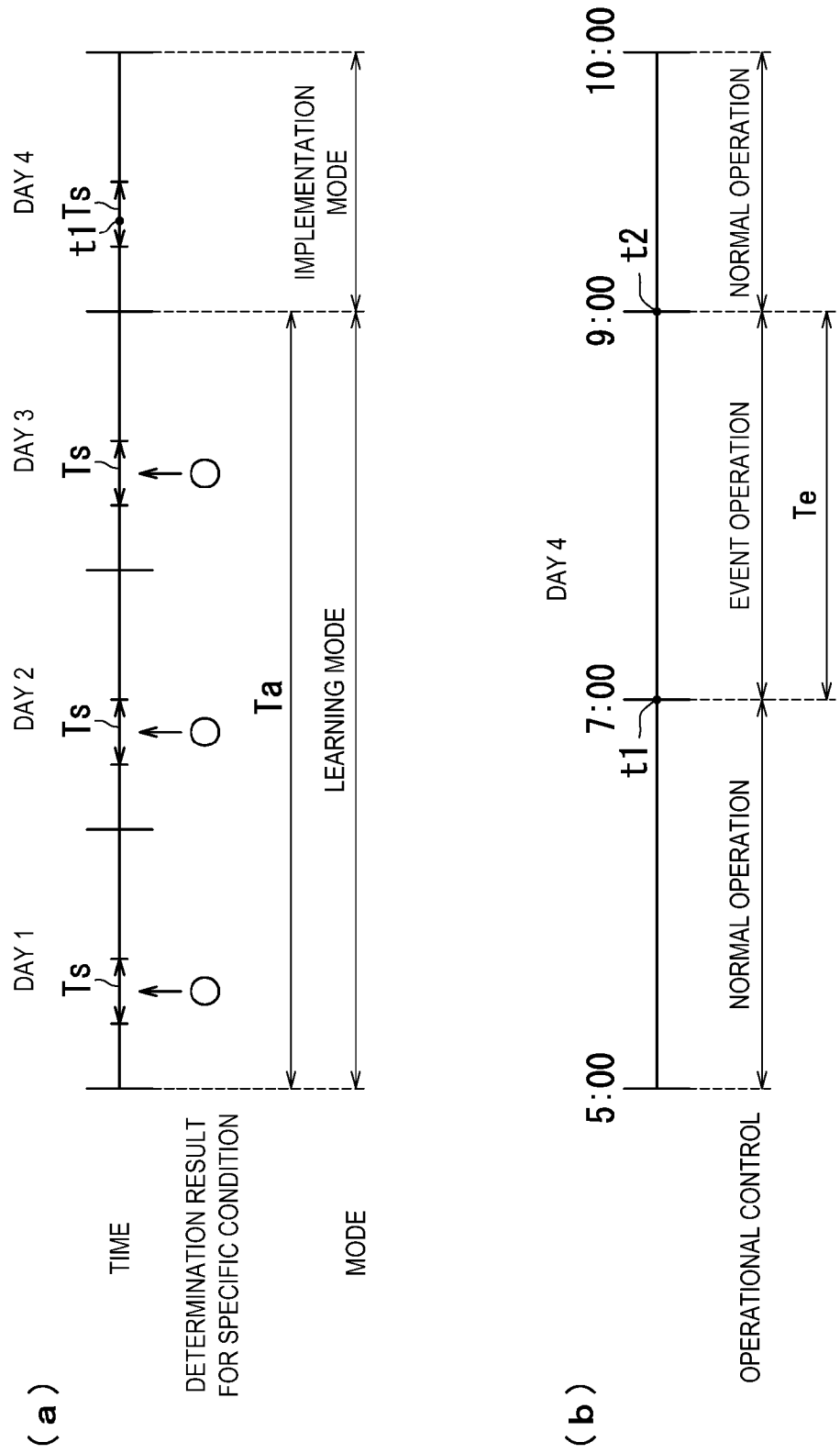
FIGS. 2(a) and 2(b) are diagrams illustrating operational control of the air purifier.

As described with reference to FIG. 1 and FIG. 2, in the case where the control unit 110 determines that the environment information satisfies the specific condition a plurality of times, the control unit 110 switches the mode from the learning mode to the implementation mode. The control unit 110 performs, in the implementation mode, the event operational control in a case where the environment information meets the trigger during the specific time period Ts. Thus, operational control corresponding to the event can be performed.

The control unit 110 determines that the environment information satisfies the specific condition based on whether all pieces of specific environment information among the plurality of pieces of environment information satisfy the specific condition. Thus, the control unit 110 can accurately determine that an event tends to occur during the specific time period Ts. As a result, operational control corresponding to the event can be performed.

The control unit 110 determines that the trigger is met based on whether at least one piece of environment information among the specific pieces of environment information satisfies the prescribed condition. Accordingly, even in a case where the control unit 110 does not determine that all pieces of the specific environment information satisfy the specific condition, the control unit 110 can switch the control to the event operational control. As a result, operational control corresponding to the event can be performed quickly in accordance with the user's lifestyle.

The operational control of the air purifier 100 will be described with reference to FIG. 3. FIG. 3 is a diagram illustrating a correspondence between the events, the specific time periods Ts, the specific conditions, the triggers, and the event operational control.

As illustrated in FIG. 3, the storage unit 120 stores the specific time periods Ts, the specific conditions, the triggers, and the event operational control in association with the events.

The storage unit 120 stores the specific time period Ts "5:00 to 10:00" in association with the event "wake-up". The storage unit 120 stores the specific conditions "illuminance from dark to light", "detect odor", and "detect dust" in association with the event "wake-up". The storage unit 120 stores the trigger "illuminance from dark to light" in association with the event "wake-up". The storage unit 120 stores the event operational control "first control" in association with the event "wake-up". The "first control" includes, for example, setting the sensitivity of the odor sensor 134 to "high", setting the sensitivity of the dust sensor 136 to "high", and raising the air flow rate of the fan 180 by one stage.

The storage unit 120 stores the specific time period Ts "17:00 to 21:00" in association with the event "cooking". The storage unit 120 stores the specific conditions "illuminance is light", "detect odor", and "detect dust" in association with the event "cooking". The storage unit 120 stores the trigger "detect odor" in association with the event "cooking". The storage unit 120 stores the event operational control "second control" in association with the event "cooking". The "second control" includes, for example, raising the air flow rate of the fan 180 by one stage and setting the sensitivity of the odor sensor 134 to "high".

The storage unit 120 stores the specific time period Ts "11:00 to 21:00" in association with the event "yakiniku (meat grilling)". The storage unit 120 stores the specific conditions "illuminance is light", "PM2.5 of prescribed amount or more", and "motion sensor detects" in association with the event "yakiniku (meat grilling)". The condition "PM2.5 of prescribed amount or more" indicates that, for example, the amount of PM2.5 dust detected by the dust sensor 136 is 100 µg or more. The storage unit 120 stores the trigger "PM2.5 of prescribed amount or more" in association with the event "yakiniku (meat grilling)". The storage unit 120 stores the event operational control "third control" in association with the event "yakiniku (meat grilling)". The "third control" includes, for example, fixing the air flow rate of the fan 180 to "medium".

The storage unit 120 stores the specific time period Ts "21:00 to 8:00" in association with the event "bedtime". The storage unit 120 stores the specific conditions "illuminance from light to dark", "detect odor", "detect dust", and "motion sensor detects" in association with the event "bedtime". The storage unit 120 stores the trigger "illuminance from light to dark" in association with the event "bedtime". The storage unit 120 stores the event operational control "fourth control" in association with the event "bedtime". The "fourth control" is control including, for example, reducing the air flow rate of the fan 180 to suppress an operation noise of the air purifier 100.

The storage unit 120 stores the specific time period Ts "6:00 to 21:00" in association with the event "outing". The storage unit 120 stores the specific conditions "detect odor" and "detect dust" in association with the event "outing". The storage unit 120 stores the trigger "GPS: out" in association with the event "outing". Specifically, the trigger "GPS: out" indicates that the control unit 110 determines that the user is not present in the room in which the air purifier 100 is installed, based on the GPS function of the mobile terminal 300. The storage unit 120 stores the event operational control "fifth control" in association with the event "outing". The "fifth control" includes, for example, stopping the humidifying unit 150 from humidifying and fixing the air flow rate of the fan 180 to "medium". Note that in the fifth control, the air flow direction of the fan 180 may be changed.

The storage unit 120 stores the specific time period Ts "6:00 to 21:00" in association with the event "going home". The storage unit 120 stores the specific condition "outing mode" in association with the event "going home". Specifically, the "outing mode" indicates that the outing mode is running. The storage unit 120 stores the trigger "GPS: in" in association with the event "going home". Specifically, the trigger "GPS: in" indicates that the control unit 110 determines that the user is present in the room in which the air purifier 100 is installed, based on the GPS function of the mobile terminal 300. The storage unit 120 stores the event operational control "sixth control" in association with the event "going home". The "sixth control" includes, for example, switching the control to the normal operational control.

Figure 4:
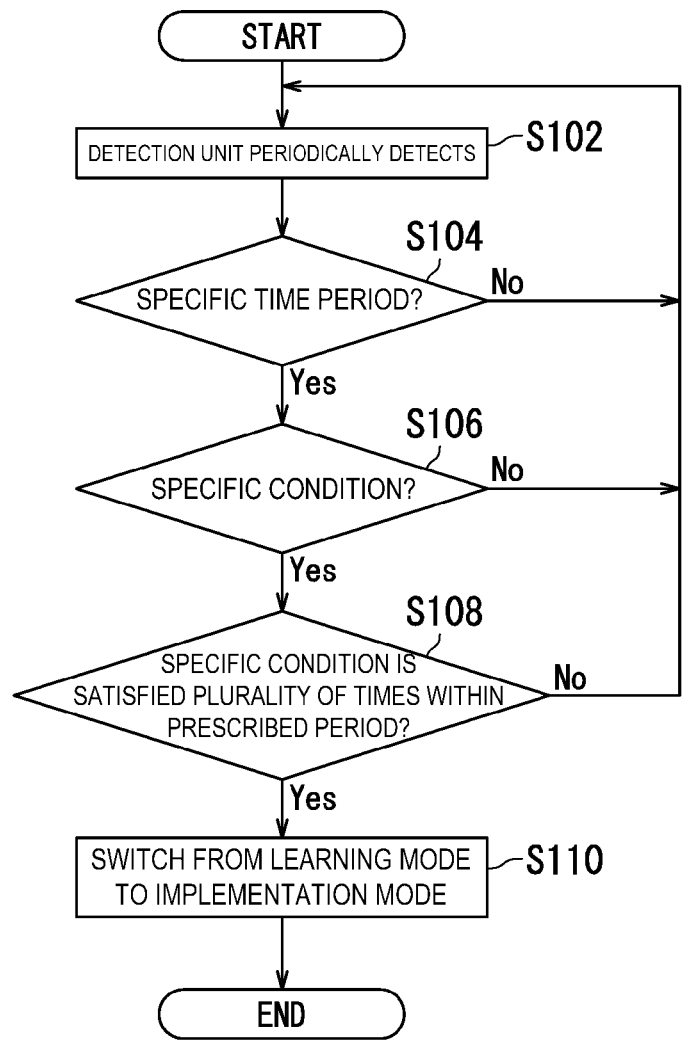
FIG. 4 is a flowchart illustrating a control method for the air purifier according to the first embodiment of the present invention.

A control method for the air purifier 100 according the present invention will be described with reference to FIG. 4. FIG. 4 is a flowchart illustrating the control method for the air purifier 100 according to the first embodiment of the present invention. Processes in steps S102 to S110 illustrated in FIG. 4 are performed to switch the mode from the learning mode to the implementation mode.

Step S102: The detection unit 130 periodically detects the environment information. The process proceeds to step S104.

Step S104: The control unit 110 determines whether a time is during the specific time period Ts. In a case where the control unit 110 determines that the time is not during the specific time period Ts (step S104: No), the process returns to step S102. In a case where the control unit 110 determines that the time is during the specific time period Ts (step S104: Yes), the process proceeds to step S106.

Step S106: The control unit 110 determines whether or not the environment information satisfies the specific condition. In a case where the control unit 110 determines that the environment information does not satisfy the specific condition (step S106: No), the process returns to step S102. In a case where the control unit 110 determines that the environment information satisfies the specific condition (step S106: Yes), the process proceeds to step S108.

Step S108: The control unit 110 determines whether or not the specific condition is satisfied a plurality of times within the prescribed period. In a case where the control unit 110 does not determine that the specific condition is satisfied a plurality of times within the prescribed period (step S108: No), the process returns to step S102. That is, the learning mode is maintained. In a case where the control unit 110 determines that the specific condition is satisfied a plurality of times within the prescribed period (step S108: Yes), the process proceeds to step S110.

Step S110: The control unit 110 switches the mode from the learning mode to the implementation mode. The process ends.

Figure 5:
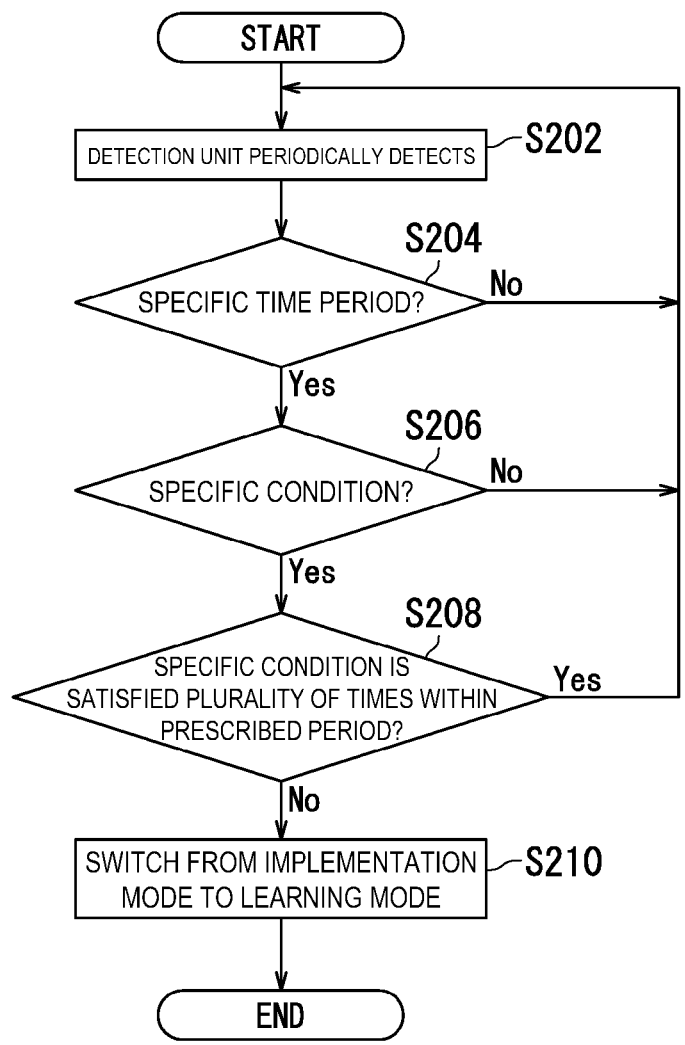
FIG. 5 is a flowchart illustrating the control method for an air purifier according to the first embodiment of the present invention.

Subsequently, the control method for the air purifier 100 according to the present invention will be described with reference to FIG. 5. FIG. 5 is a flowchart illustrating the control method for the air purifier 100 according to the first embodiment of the present invention. The processes in steps S202 to S210 illustrated in FIG. 5 are performed to switch the mode from the implementation mode to the learning mode.

Step S202: The detection unit 130 periodically detects the environment information. The process proceeds to step S204.

Step S204: The control unit 110 determines whether a time is during the specific time period Ts. In a case where the control unit 110 determines that the time is not during the specific time period Ts (step S204: No), the process returns to step S202. In a case where the control unit 110 determines that the time is during the specific time period Ts (step S204: Yes), the process proceeds to step S206.

Step S206: The control unit 110 determines whether or not the environment information satisfies the specific condition. In a case where the control unit 110 determines that the environment information does not satisfy the specific condition (step S206: No), the process returns to step S202. In a case where the control unit 110 determines that the environment information satisfies the specific condition (step S206: Yes), the process proceeds to step S208.

Step S208: The control unit 110 determines whether or not the specific condition is satisfied a plurality of times within the prescribed period. In a case where the control unit 110 determines that the specific condition is satisfied a plurality of times within the prescribed period (step S208: Yes), the process returns to step S202. That is, the control unit 110 continues the implementation mode. In a case where the control unit 110 does not determine that the specific condition is satisfied a plurality of times within the prescribed period (step S208: No), the process proceeds to step S210.

Step S210: The control unit 110 switches the mode from the implementation mode to the learning mode. The process ends.

As described above with reference to FIG. 5, the control unit 110 determines, in the implementation mode, whether or not the environment information satisfies the specific condition a plurality of times during the specific time period Ts corresponding to the event within the prescribed period. In the case where the control unit 110 determines that the environment information satisfies the specific condition a plurality of times, the control unit 110 continues the implementation mode. On the other hand, in the case where the control unit 110 does not determine that the environment information satisfies the specific condition a plurality of times, the control unit 110 switches the mode from the implementation mode to the learning mode. Accordingly, in a case where no event tends to occur, the mode can be switched from the implementation mode to the learning mode.

Figure 6:
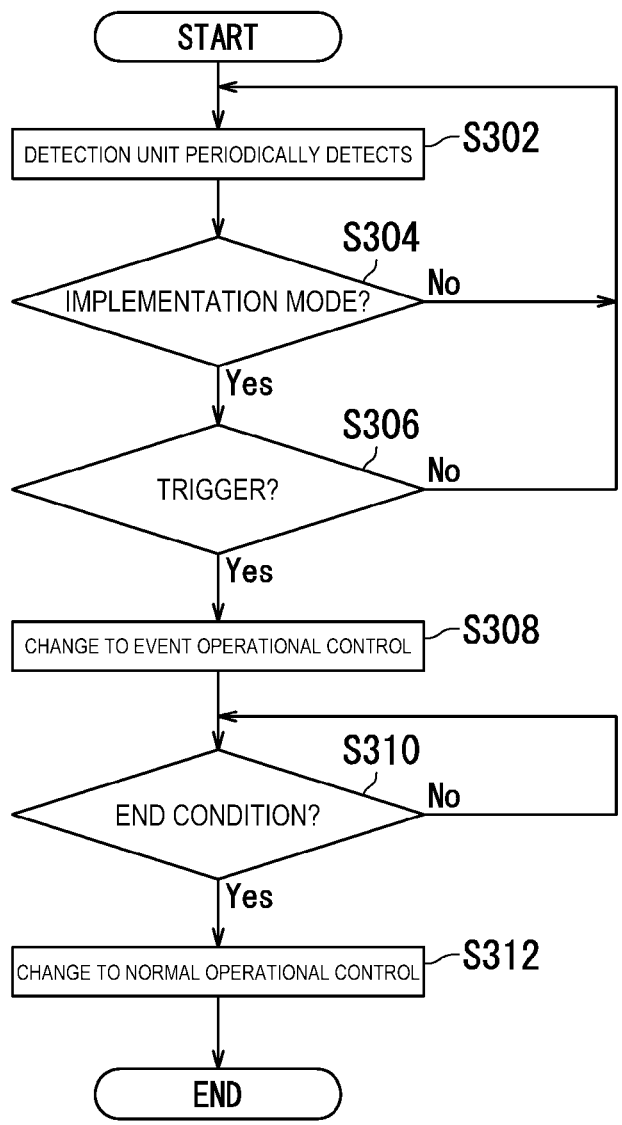
FIG. 6 is a flowchart illustrating the control method for an air purifier according to the first embodiment of the present invention.

Subsequently, the control method for the air purifier 100 according to the present invention will be described with reference to FIG. 6. FIG. 6 is a flowchart illustrating the control method for the air purifier 100 according to the first embodiment of the present invention. The processes in steps S302 to S312 illustrated in FIG. 6 are performed to switch the operational control.

Step S302: The detection unit 130 periodically detects the environment information. The process proceeds to step S304.

Step S304: The control unit 110 determines whether or not the mode is the implementation mode. In a case where the control unit 110 determines that the mode is not the implementation mode (step S304: No), the process returns to step S302. In a case where the control unit 110 determines that the mode is the implementation mode (step S304: Yes), the process proceeds to step S306.

Step S306: The control unit 110 determines whether or not a trigger is met. In a case where the control unit 110 determines that the trigger is not met (step S306: No), the process returns to step S302. In a case where the control unit 110 determines that the trigger is met (step S306: Yes), the process proceeds to step S308.

Step S308: The control unit 110 changes the operational control from the normal operational control to the event operational control. The process proceeds to step S310.

Step S310: The control unit 110 determines whether or not an end condition is satisfied. In a case where the control unit 110 determines that the end condition is not satisfied (step S310: No), the process returns to step S310. In a case where the control unit 110 determines that the end condition is satisfied (step S310: Yes), the process proceeds to step S312.

Step S312: The control unit 110 changes the operational control from the event operational control to the normal operational control. The process ends.

Next, the switching between the learning mode and the implementation mode of the air purifier 100 will be described with reference to FIGS. 7(a) and 7(b). FIGS. 7(a) and 7(b) are diagrams illustrating examples of switching from the learning mode to the implementation mode of the air purifier 100.

In FIGS. 7(a) and 7(b), the marks "o" in the fields of the specific conditions indicate that the environment information satisfies the specific conditions. In FIGS. 7(a) and 7(b), the marks "X" in the fields of the specific conditions indicate that the environment information does not satisfy the specific conditions.

In the examples illustrated in FIGS. 7(a) and 7(b), in a case where the control unit 110 determines that the environment information satisfies the specific condition for a continuous prescribed number of days or more, the control unit 110 switches the mode from the learning mode to the implementation mode. For example, in a case where the control unit 110 determines that the environment information satisfies the specific condition continuously for three days or more, the control unit 110 switches the mode from the learning mode to the implementation mode.

As illustrated in FIG. 7(a), in a case where the control unit 110 determines that the environment information satisfies the specific condition continuously for three days from day 1 to day 3, the control unit 110 switches the mode from the learning mode to the implementation mode on 4.

As illustrated in FIG. 7(b), in a case where the environment information no longer satisfies the specific condition continuously for three days on day 6, the control unit 110 switches the mode from the implementation mode to the learning mode on day 6.

Next, the switching between the learning mode and the implementation mode of the air purifier 100 will be described with reference to FIGS. 8(a) and 8(b). FIGS. 8(a) and 8(b) are diagrams illustrating examples of the switching from the learning mode to the implementation mode of the air purifier 100.

In FIGS. 8(a) and 8(b), the marks "o" in the fields of the specific conditions indicate that the environment information satisfies the specific conditions. In FIGS. 8(a) and 8(b), the marks "X" in the fields of the specific conditions indicate that the environment information does not satisfy the specific conditions.

In the examples illustrated in FIGS. 8(a) and 8(b), in a case where the control unit 110 determines that the environment information satisfies the specific condition for a prescribed number of days or more among a plurality of days, the control unit 110 switches the mode from the learning mode to the implementation mode. For example, in a case where the control unit 110 determines that the environment information satisfies the specific condition for three days among a period of four days, the control unit 110 switches the mode from the learning mode to the implementation mode.

As illustrated in FIG. 8(a), in a case where the control unit 110 determines that the environment information satisfies the specific condition for three days among a period of four days from day 1 to day 4, the control unit 110 switches the mode from the learning mode to the implementation mode on day 5.

As illustrated in FIG. 8(b), in a case where it is determined, on day 6, that the environment information satisfies the specific condition only on two days among a period of four days from day 3 to day 6, the control unit 110 switches the mode from the implementation mode to the learning mode on day 6.

Next, the switching between the learning mode and the implementation mode of the air purifier 100 will be described with reference to FIG. 9. FIG. 9 is a diagram illustrating an example of the switching from the learning mode to the implementation mode of the air purifier 100.

In FIG. 9, the marks "o" in the fields of the specific conditions indicate that the environment information satisfies the specific conditions.

In the examples illustrated in FIG. 7 and FIG. 8, the prescribed period for determining the occurrence of an event includes a plurality of days. In other words, the prescribed period is longer than the specific time period. Note that the prescribed period may be shorter than the specific time period. In the example illustrated in FIG. 9, the prescribed period is shorter than the specified time period. In a case where the control unit 110 determines that the environment information satisfies the specific condition continuously for a prescribed number of times or more, the control unit 110 switches the mode from the learning mode to the implementation mode. For example, in a case where the control unit 110 determines that the environment information satisfies the specific condition continuously three times or more, the control unit 110 switches the mode from the learning mode to the implementation mode. This example corresponds to the event "yakiniku (meat grilling)" illustrated in FIG. 3.

As illustrated in FIG. 9, in a case where the control unit 110 determines that the environment information satisfies the specific condition three times continuously at "19:00", "19:15", and "19:30", the control unit 110 switches the mode from the learning mode to the implementation mode at 19:45 corresponding to the fourth time.

Second Embodiment

Figure 10:
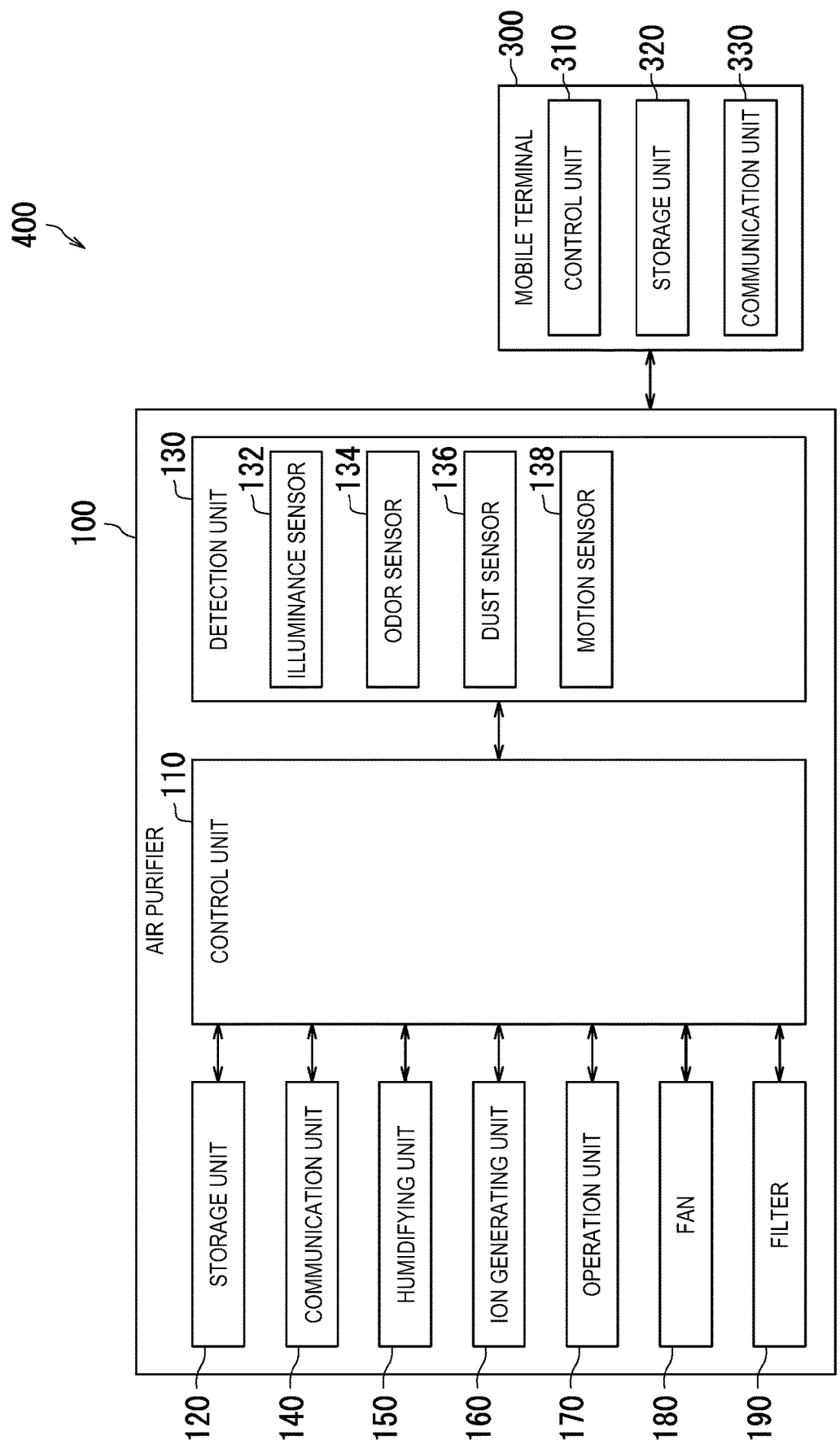
FIG. 10 is a block diagram of an air purifying system including an air purifier according to a second embodiment of the present invention.

An air purifier 100 according to a second embodiment of the present invention will be described with reference to FIG. 10. FIG. 10 is a block diagram of an air purifying system 400 including the air purifier 100 according to the second embodiment of the present invention. The air purifying system 400 according to the second embodiment has the same configuration as the air purifying system 400 according to the first embodiment, except that the air purifying system 400 according to the second embodiment does not include the server 200, and thus, duplicated description of similar components is omitted.

As illustrated in FIG. 10, the air purifying system 400 includes the air purifier 100 and the mobile terminal 300.

In the present embodiment, the server 200 is not provided. The history of the environment information is stored in the storage unit 120 in the air purifier 100. In the present embodiment as well, operational control corresponding to the event can be performed in the same manner as in the first embodiment.

Third Embodiment

Figure 11:
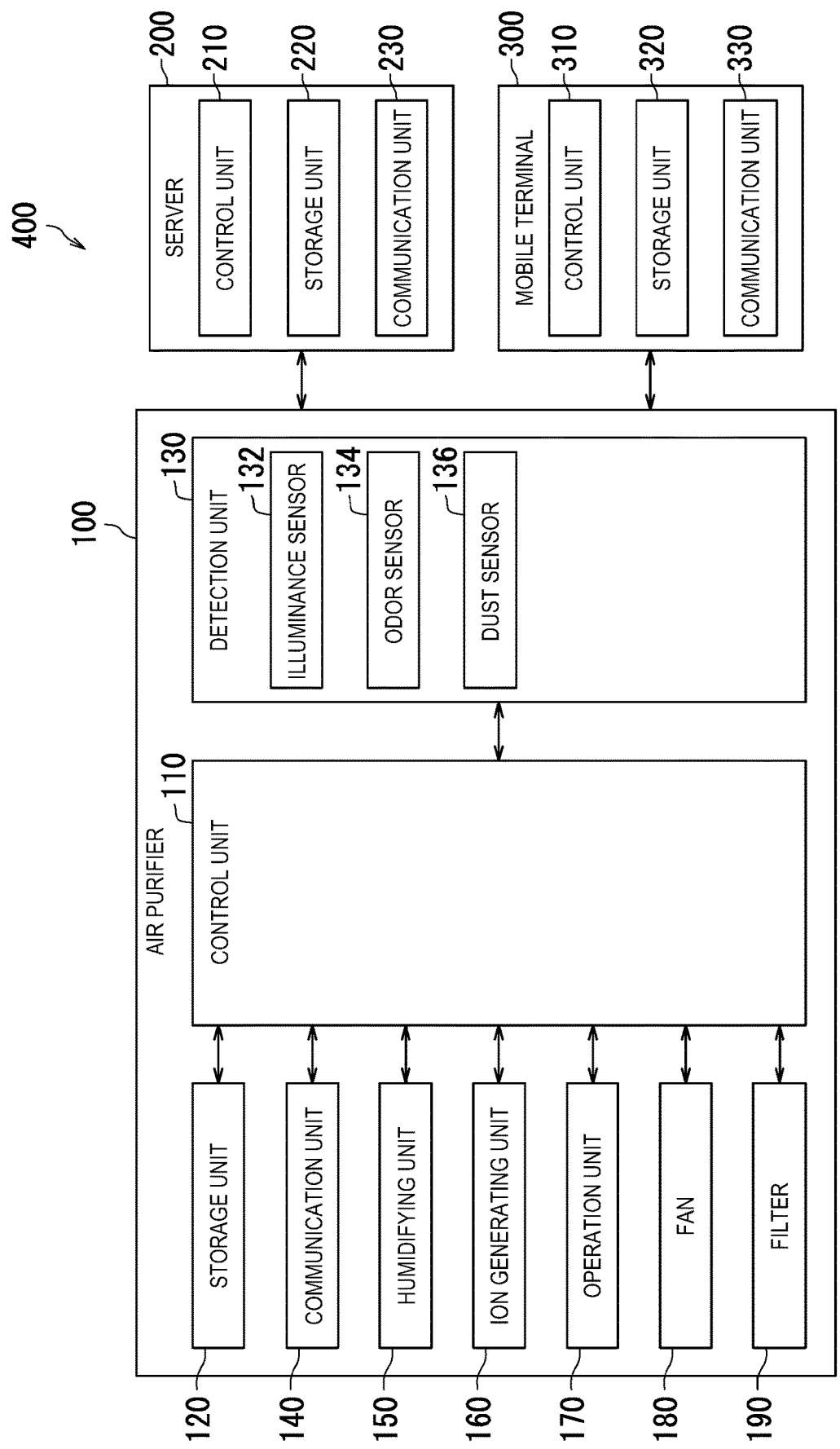
FIG. 11 is a block diagram of an air purifying system including an air purifier according to a third embodiment of the present invention.

An air purifier 100 according to a third embodiment of the present invention will be described with reference to FIG. 11. FIG. 11 is a block diagram of an air purifying system 400 including the air purifier 100 according to the third embodiment of the present invention. The air purifier 100 according to the third embodiment has the same configuration as the air purifier 100 according to the first embodiment, except that the air purifier 100 according to the third embodiment does not include the motion sensor 138, and thus, duplicated description of similar components is omitted.

As illustrated in FIG. 11, the air purifying system 400 includes the air purifier 100, the server 200, and the mobile terminal 300.

In the present embodiment, the air purifier 100 does not include the motion sensor 138. In the present embodiment, the control unit 110 determines whether or not the user is present in the room in which the air purifier 100 is installed, based on the GPS function of the mobile terminal 300. Specifically, based on the location information of the mobile terminal 300 indicated by the GPS function of the mobile terminal 300, the control unit 110 determines whether a distance between the air purifier 100 and the mobile terminal 300 is within a prescribed range to determine whether or not the user is present in the room in which the air purifier 100 is installed. In the present embodiment as well, operational control corresponding to the event can be performed in the same manner as in the first and second embodiments.

In the above description, the embodiments of the present invention are described with reference to the drawings (FIG. 1 to FIG. 11). However, the present invention is not limited to the embodiment described above, and it is possible to implement the present invention in various modes without departing from the gist of the disclosure. The drawings primarily schematically illustrate each of the constituent elements for the sake of easier understanding, and the thickness, length, number, and the like of each of the illustrated constituent elements are different from the actual thickness, length, number, and the like by reason of making of the drawings. The material, shape, dimensions, and the like of each of the constituent elements illustrated in the embodiment described above are merely exemplary and are not particularly limiting, and various modifications can be made within the scope not departing from the effects of the present invention in essence.

REFERENCE SIGNS LIST

100 Air purifier
110 Control unit

130 Detection unit
150 Humidifying unit
170 Operation unit
180 Fan
200 Server
300 Mobile terminal
400 Air purifying system
Ta Prescribed period
Ts Specific time period

The invention claimed is:

1. An air purifier comprising:
a detection unit configured to periodically detect environment information indicating information relating to an environment around the air purifier; and
a control unit configured to determine whether or not the environment information satisfies a specific condition a plurality of times during a specific time period corresponding to an event within a prescribed period, and, in a case of determining that the environment information satisfies the specific condition a plurality of times, switch a mode from a learning mode to an implementation mode,
wherein in the implementation mode, in a case where the environment information meets a trigger during the specific time period, the control unit performs event operational control.

2. The air purifier according to claim 1,
wherein the control unit, in the implementation mode, changes control from a normal operational control to the event operational control in a case where the trigger is met.

3. The air purifier according to claim 2,
wherein the control unit, in the implementation mode, changes the control from the event operational control to the normal operational control in a case where an end condition is satisfied.

4. The air purifier according to claim 1,
wherein the control unit, in the implementation mode, determines whether or not the environment information satisfies the specific condition a plurality of times during the specific time period corresponding to the event within the prescribed period, and in a case of determining that the environment information satisfies the specific condition a plurality of times, the control unit continues the implementation mode, and in a case of not determining that the environment information satisfies the specific condition a plurality of times, the control unit switches the mode from the implementation mode to the learning mode.

5. The air purifier according to claim 1,
wherein the prescribed period is a period including a plurality of days, and
in a case where the control unit determines that the environment information satisfies the specific condition for a prescribed number of days or more among the plurality of days, the control unit switches the mode from the learning mode to the implementation mode.

6. The air purifier according to claim 1,
wherein, in a case where the control unit determines that the environment information satisfies the specific condition continuously for a prescribed number of days or more, the control unit switches the mode from the learning mode to the implementation mode.

7. The air purifier according to claim 1,
wherein, in a case where the control unit determines that the environment information continuously satisfies the specific condition a prescribed number of times or more, the control unit switches the mode from the learning mode to the implementation mode.

8. The air purifier according to claim 1,
wherein the detection unit detects a plurality of pieces of the environment information, and
the control unit determines that the environment information satisfies the specific condition based on whether all pieces of specific environment information among the plurality of pieces of the environment information satisfy the specific condition.

9. The air purifier according to claim 8,
wherein the control unit determines that the trigger is met based on whether at least one piece of environment information among pieces of specific environment information satisfies a prescribed condition.

10. The air purifier according to claim 1,
wherein the environment information includes at least one of illuminance, odor, dust, and user location information.

11. The air purifier according to claim 1,
wherein the event operational control changes a sensitivity of the detection unit.

12. The air purifier according to claim 1, further comprising a fan configured to take air in a room in which the air purifier is installed into the air purifier,
wherein the event operational control includes changing an air flow rate of the fan and changing an air flow direction of the fan.

13. The air purifier according to claim 1, further comprising a humidifying unit configured to humidify a room in which the air purifier is installed,
wherein the event operational control includes operation switching of the humidifying unit.

14. A control method for an air purifier, the control method comprising:
periodically detecting environment information indicating information relating to an environment around the air purifier;
determining whether or not the environment information satisfies a specific condition a plurality of times during a specific time period corresponding to an event within a prescribed period, and, in a case of determining that the environment information satisfies the specific condition a plurality of times, switching a mode from a learning mode to an implementation mode; and
performing, in a case where the environment information meets a trigger during the specific time period, event operational control in the implementation mode.

* * * * *